(12) United States Patent
Alspaugh

(10) Patent No.: US 11,400,858 B1
(45) Date of Patent: Aug. 2, 2022

(54) RETRACTABLE LIGHTING DEVICE FOR ILLUMINATING TRAILERS AND OTHER AREAS

(71) Applicant: Amazon Technologies, Inc., Seattle, WA (US)

(72) Inventor: David L. Alspaugh, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/170,994

(22) Filed: Feb. 9, 2021

(51) Int. Cl.
| | |
|---|---|
| B60Q 3/57 | (2017.01) |
| B60Q 3/80 | (2017.01) |
| B62D 63/08 | (2006.01) |
| B60Q 3/30 | (2017.01) |
| F21S 4/22 | (2016.01) |
| F21S 43/50 | (2018.01) |
| B60Q 1/30 | (2006.01) |
| F21W 103/15 | (2018.01) |
| F21S 4/20 | (2016.01) |

(52) U.S. Cl.
CPC ............... *B60Q 3/57* (2017.02); *B60Q 1/305* (2013.01); *B60Q 3/30* (2017.02); *B60Q 3/80* (2017.02); *B62D 63/08* (2013.01); *F21S 4/22* (2016.01); *F21S 43/51* (2018.01); *F21S 4/20* (2016.01); *F21W 2103/15* (2018.01)

(58) Field of Classification Search
CPC ... B60Q 3/57; B60Q 3/80; B60Q 3/30; B60Q 1/305; F21S 4/22; F21S 43/51; F21S 4/20; B62D 63/08; F21W 2103/15
USPC ......................................................... 362/485
See application file for complete search history.

(56) References Cited

U.S. PATENT DOCUMENTS

| | | | | |
|---|---|---|---|---|
| 5,572,837 | A * | 11/1996 | Featherstone | E04H 12/182 52/118 |
| 2011/0182066 | A1* | 7/2011 | Webb | F21V 21/22 362/235 |
| 2013/0039049 | A1* | 2/2013 | Jones | F21L 14/04 362/184 |
| 2013/0335972 | A1* | 12/2013 | Hubner | B60Q 1/2657 362/253 |

* cited by examiner

*Primary Examiner* — Laura K Tso
(74) *Attorney, Agent, or Firm* — Thomas | Horstemeyer, LLP.

(57) ABSTRACT

Disclosed are various embodiments for a retractable lighting device for illuminating trailers and other areas. A retractable lighting device is configured to transition between collapsed and non-collapsed states where the retractable lighting device may include one or more light emitting components. A controller may be communicatively coupled to the driving mechanism, wherein the controller is configured to transmit a signal to the driving mechanism that causes the driving mechanism to transition the retractable lighting device from a collapsed state to a non-collapsed state and vice versa.

20 Claims, 10 Drawing Sheets

RETRACTABLE LIGHTING DEVICE FOR ILLUMINATING TRAILERS AND OTHER AREAS

BACKGROUND

Loading and unloading trailers tends to be a manual process that requires warehouse personnel to physically load and remove boxes and other items using dollies and similar devices at all times of the day. Various areas of the trailer, especially rear portions of the trailer, become dark which creates safety risks for warehouse personnel. Today, warehouse loading and unloading procedures generally include positioning a single lighting device in a warehouse that is angled towards the interior a trailer during loading and unloading. When personnel perform loading and unloading operations, a shadow is typically cast which inhibits the personnel from seeing inside the trailer.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. Moreover, in the drawings, like reference numerals designate corresponding parts throughout the several views.

DETAILED DESCRIPTION

Figure 1:
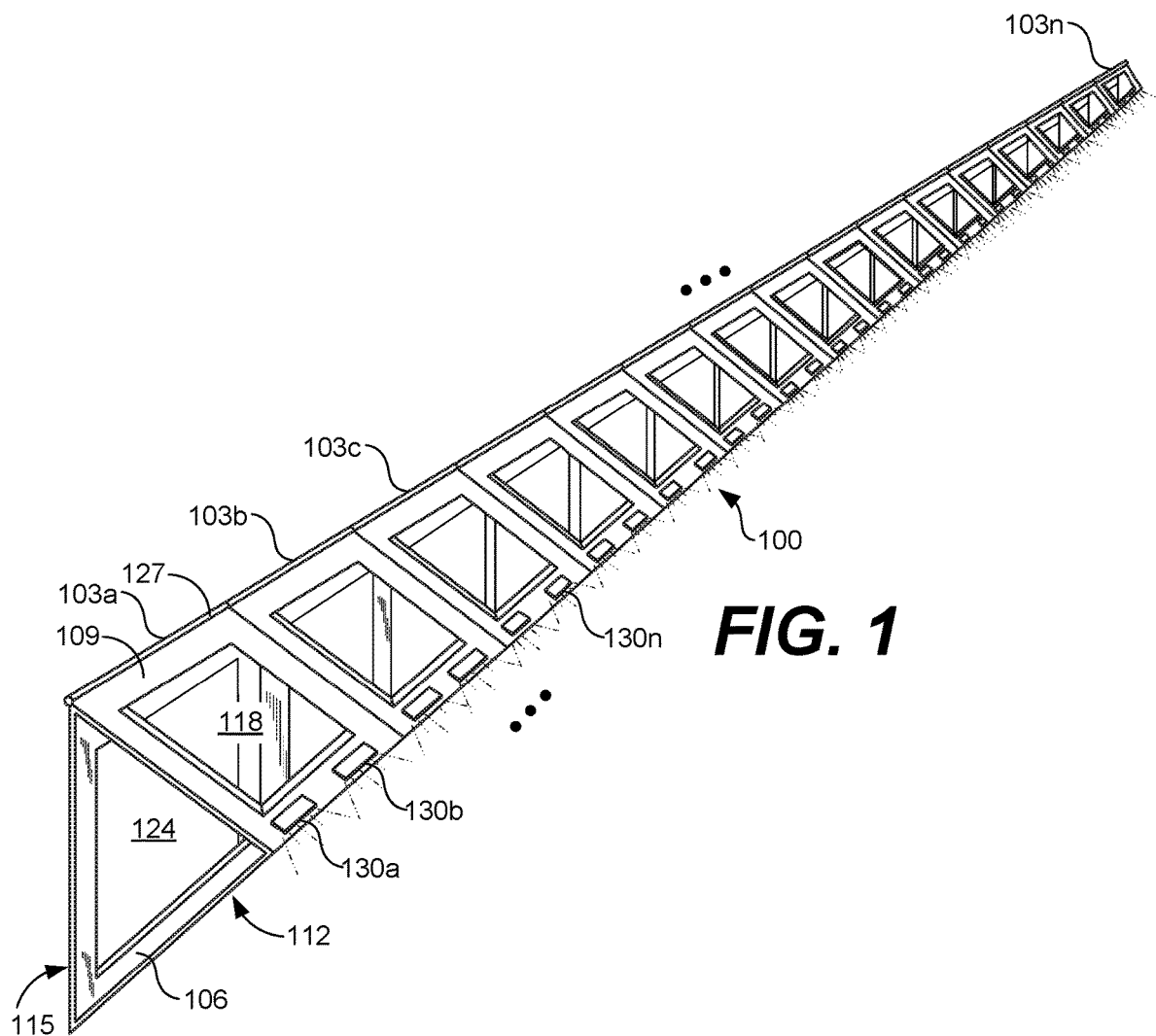
FIG. 1 is a top perspective view of a retractable lighting device according to various embodiments of the present disclosure.

The present disclosure relates to a retractable lighting device for illuminating trailers and other areas. Today, unloading and loading operations performed by warehouse personal include positioning a device that includes a light and a fan near a dock door that shines a light into the trailer. This light is ineffective at reaching the depth of the trailer and often leaves shadows in important areas where personnel need to work, thereby creating safety concerns and reducing productivity.

According to various embodiments of the present disclosure, a retractable lighting device is described that includes a semi-automated coiling lighting device capable of being mounted near a dock door in a warehouse, cross-dock facility, fulfillment center, or other structure. When activated, the retractable lighting device can uncoil or otherwise extend into a trailer that is positioned adjacent to or near the dock door.

In various embodiments, the lighting device includes a plurality of segments having at least one light emitting component, such as a light-emitting diode (LED). In some embodiments, the segments include triangular-shaped segments that provide illumination and multiple angles while permitting the lighting device to coil into a spool or other collapsed arrangement when not in use. When light is needed, for instance, during a loading or unloading operation, the lighting device may extend from a position in a facility through a dock door and into a trailer. In some embodiments, when the lighting device extends into the trailer, a wheel positioned on a rear face of the lighting device may contact and roll along an inside surface of the trailer as it extends to various depths of the trailer.

In further embodiments, the retractable lighting device may include a guidance and object avoidance system. The guidance and object avoidance system may include a proximity sensor and a controller configured to identify the presence of an object (e.g., a box or container) that may inhibit the retractable lighting device from extending further into the trailer. Based on a measurement obtained from the proximity sensor, a controller of the retractable lighting device may determine whether or not to advance the lighting device further into the trailer, thereby allowing the lighting device to automatically extend when personnel remove a box or other item (e.g., when unloading a fluid load truck).

In some embodiments, the retractable lighting device comprises a first set and a second set of light emitting diodes (LEDs) mounted on each triangular-shaped segment. The first set and second set of LEDs may provide both direct and indirect lighting to fully illuminate a trailer or other area, creating a safer and more tolerable work environment for personnel performing operations in or near the trailer or other area.

In the following discussion, a general description of a lighting system having a retractable lighting device and its components is provided, followed by a discussion of the operation of the same.

With reference to FIG. 1, a non-limiting example of a retractable lighting device 100, or a portion thereof, is shown according to various embodiments. As shown in FIG. 1, the retractable lighting device 100 may include multiple segments 103a . . . 103n (collectively "segments 103") coupled to one another to form an elongated lighting device. For instance, each of the segments 103 may be pivotably and/or electrically coupled to an adjacent one of the segments 103 such that the retractable lighting device 100 may be coiled or otherwise collapsed for storage, as will be described. As such, the retractable lighting device 100 may include a deformable, collapsible, and/or extendible body, as will be described.

While FIG. 1 shows sixteen of the segments 103, it is understood that a number of the segments 103 may be more or less than sixteen. In some embodiments, the retractable lighting device 100 has a length between five and twenty-five feet, although other lengths may be employed.

Referring to a representative one of the segments 103a, in various embodiments, each of the segments 103 of the retractable lighting device 100 may include a frame 106. As shown in FIG. 1, the frame 106 may include a hollow frame section having a size and shape that defines a triangular-shaped segment body. In other words, each of the segments 103 may include a triangular-shaped segment in some embodiments. For embodiments in which the segments 103 are triangular-shaped, the segments 103 may include a first face 109, a second face 112, and a third face 115. The segments 103 may include open side faces as well, as shown in FIG. 1, or partially open side faces.

According to various embodiments, the frame 106 may be formed of a lightweight material having sufficient rigidity and strength to permit a distal portion of the retractable lighting device 100 to extend and cantilever with respect to a coiled or collapsed portion that is fixed to a wall of a warehouse or other facility. As such, the frame 106 may be formed of aluminum, carbon fiber, rigid plastic, a combination thereof, or other suitable material.

In some embodiments, to reduce a weight of each segment 103 and the overall body of the retractable lighting device 100, the first face 109 may include at least one first notched out region 118, the second face 112 may include at least one second notched out region 121 (not shown), and the third face 115 may include at least one third notched out region 124. The notched out regions 118, 121, and 124 may include areas with no frame or areas having portions of the frame 106 removed, as may be appreciated. In some embodiments, the notched out regions 118, 121, and 124 are rectangular-shaped notched out regions. However, in alternative embodiments, the notched out regions 118, 121, and 124 may include triangular-shaped, circular-shaped, oval-shaped, or other shaped notched out regions. Further, each of the segments 103 may include a hinge 127.

Referring again to the representative segment 103a, each of the segments 103 may include at least one light emitting component. For instance, in the embodiment shown in FIG. 1, each segment includes a multitude of light emitting components 130a . . . 130n (collectively "light emitting components 130"). Each light emitting component 130 may include an LED, an LED panel, an incandescent bulb, a halogen lamp, a compact fluorescent bulb, or similar light emitting component 130 capable of projecting light. In some embodiments, the LED may include a "super-efficient" LED, as is known in the field, or an LED having an efficiency equal to or greater than 90%. Further, in some embodiments, the light emitting components 130 include a strip of light emitting components 130 positioned along a longitudinal axis of the retractable lighting device 100.

The third face 115 of the segments 103 may be aligned with a side surface of an interior of a trailer or other area, as will be discussed. For instance, when the third face 115 is parallel to or resting flush with a side surface of the interior of a trailer, each of the segments 103 may include a first face 109 having a first set of light emitting components 130 configured to project light in an upwards direction and a second face 112 having a second set of light emitting components (not shown) that are configured to project light in a downwards direction. As such, regardless of a position of the retractable lighting device 100 relative to a height of a trailer or other area to be illuminated, the retractable lighting device 100 is capable of providing ample illumination.

According to various embodiments, on the first face 109, the light emitting components 130 may be positioned below the first notched out region 118. On the second face 112, the light emitting components 130 may be positioned above the second notched out region 121. It is understood, however, that other suitable positions and arrangements of the light emitting components 130 may be employed.

Furthermore, in some embodiments, downstream ones of the segments 103 may be the same or substantially similar to the representative one of the segments 103a discussed with respect to FIG. 1. However, in alternative embodiments, downstream ones of the segments 103 may be decreasingly smaller and/or lighter with respect to the representative one of the segments 103a discussed in FIG. 1. In other words, a most-distal one of the segments 103n relative to a base of the retractable lighting device 100 (e.g., a location at which the retractable lighting device 100 is affixed to a structure) may be a smallest and/or a lightest one of the segments 103, whereas a most-proximal one of the segments 103a relative to the base of the retractable lighting device 100 may be a largest and/or a heaviest one of the segments 103.

Figure 2:
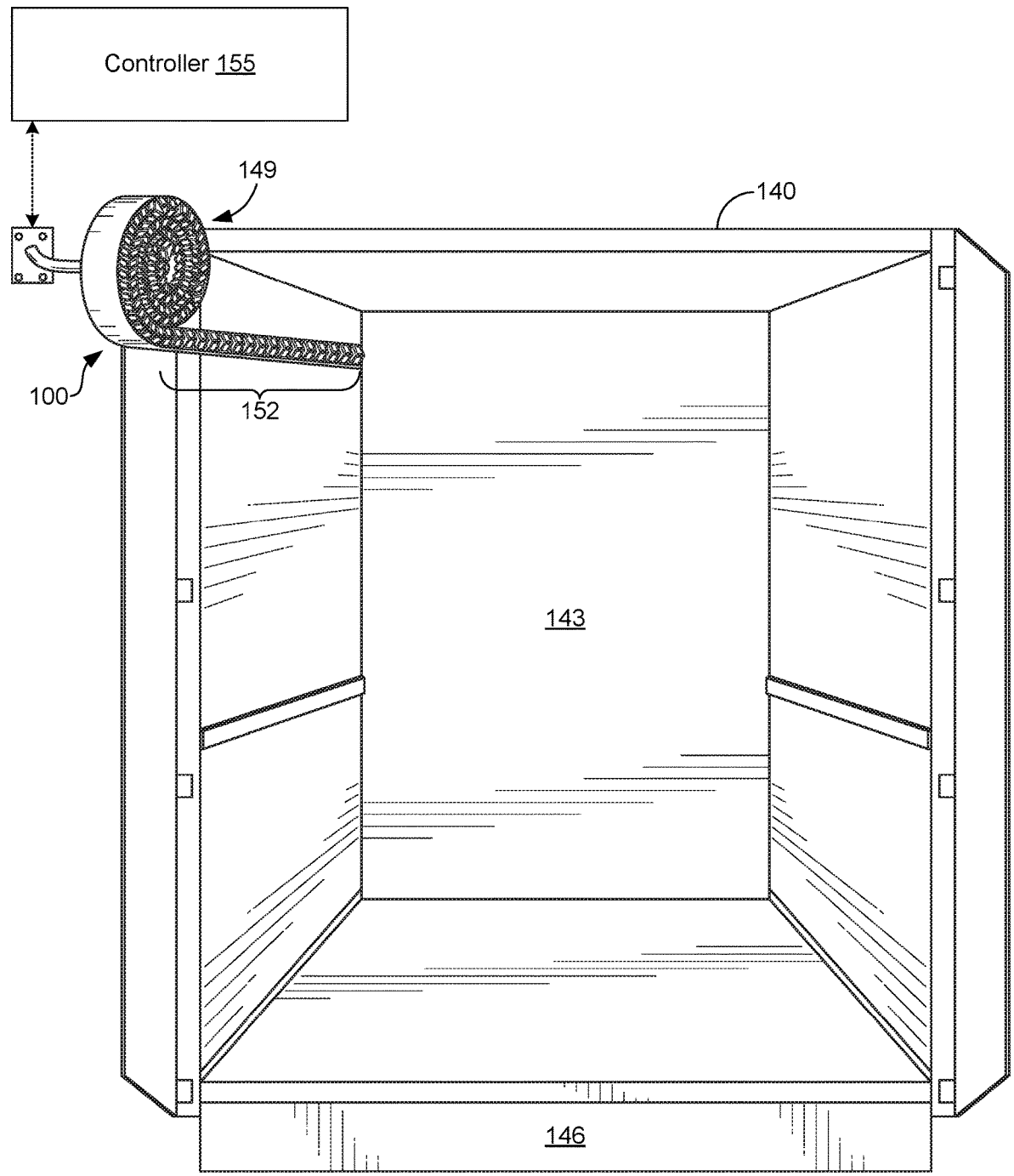
FIG. 2 is a perspective view of the retractable lighting device shown relative to a trailer according to various embodiments of the present disclosure.
Figure 3:
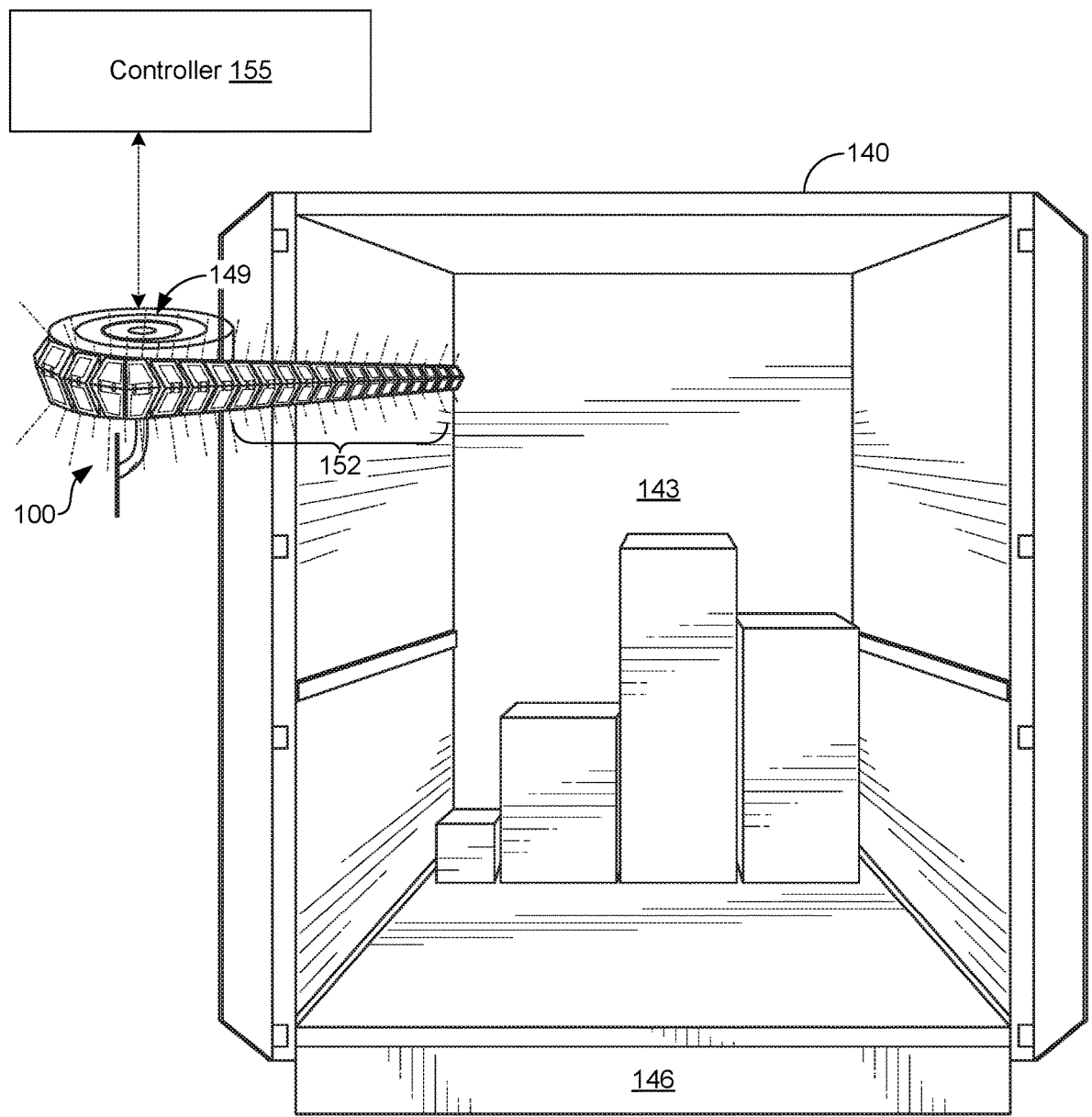
FIG. 3 is another perspective view of the retractable lighting device shown relative to the trailer according to various embodiments of the present disclosure.

Turning now to FIGS. 2 and 3, various embodiments of the retractable lighting device 100 are shown relative to a trailer 140. The trailer 140 may include a cargo container in some embodiments. As such, the trailer 140 may include one of a 20' standard dry container; 20' high cube dry container; 20' open top container; 20' flat rack container; 40' standard dry container; 40' high cube dry container; 40' standard reefer container; 40 high-cube reefer container; 40' flat rack container; 45' high cube dry container; 45' high-cube reefer container; or similar container.

In any event, the trailer 140 may have an interior region or other cargo area, generally referred to herein as an interior 143. As may be appreciated, a driver may have the trailer 140 attached to a truck or other vehicle. To perform load or unload operations, the driver may back up or otherwise maneuver the trailer 140 to align with a dock door of a warehouse, fulfillment center, or other facility. A dock plate 146 is then positioned over a gap that may exist between a floor of the trailer 140 and a floor of the facility. Thereafter, personnel of the facility may begin performing loading or unloading operations.

The retractable lighting device 100 is shown in FIGS. 2 and 3 as being mounted to an upper portion of a vertical wall or roof of a facility such that the retractable lighting device 100 is positioned closer to a top surface of the trailer 140 relative to the floor of the trailer 140. However, it is understood that, in alternative embodiments, the retractable lighting device 100 may be mounted to a lower portion of a vertical wall or floor of a warehouse such that the retractable lighting device 100 is positioned closer to the floor of the trailer 140 as opposed to the top surface of the trailer 140.

Next, a general description of the operation of the various components of the retractable lighting device 100 is provided. The retractable lighting device 100 is shown as having a portion coiled or otherwise collapsed into a state for storage when not in use, referred to herein generally as a coiled portion 149. The coiled portion 149 may be affixed or otherwise coupled to a wall or other suitable region of a warehouse or other facility. Additionally, the retractable lighting device 100 is shown as having a portion elongated such that the retractable lighting device 100 extends from the coil into the interior 143 of the trailer 140, referred to herein as extended portion 152. The extended portion 152 is cantilevered with respect to the coiled portion 149, as shown in FIGS. 2 and 3. In other words, the extended portion 152 of the retractable lighting device 100 is supported at only one end (e.g., at the coiled portion 149). Notably, FIG. 2 shows the coiled portion 149 of the retractable lighting device 100 being oriented vertically, whereas FIG. 3 shows the coiled portion 149 of the retractable lighting device 100 being oriented horizontally.

In various embodiments, a system may include the retractable lighting device 100 as well as a controller 155 configured to direct the extension of the retractable lighting device 100 into the interior 205 of the trailer 200 or other suitable region, as well as the retraction of the retractable lighting device 100 back into a warehouse. To this end, the controller 155 may be communicatively coupled to a driving mechanism and/or the retractable lighting device 100, e.g., through a wireless or wireless communication medium.

In any event, the controller 155 may be configured to transmit a signal to the driving mechanism that causes the driving mechanism to transition the retractable lighting device 100 from being wholly contained in a facility to an elongated state where at least a portion of the retractable lighting device 100 extends through the dock door and into the interior 143 of the trailer 140, and vice versa. For instance, in some embodiments, the controller 155 may be configured to transmit a signal to the driving mechanism that causes the driving mechanism to transition the retractable lighting device 100 from a coiled state that is wholly contained in a facility to an elongated state where at least a portion of the retractable lighting device 100 extends through the dock door and into the interior 143 of the trailer 140, and vice versa.

Additionally, the controller 155 may control operation of the light emitting components 130. For instance, the controller 155 may direct the light emitting components 130 to turn on or off, vary the luminous intensity of the light emitting components 130, adjust a color of light emitted by the light emitting components 130, and so forth. In some embodiments, the light emitting components 130 may include full spectrum LEDs, such that the color of the light emitted by the light emitting components may be in a range of 380-780 nm, for example. Thus, the light emitting components 130 may output red, blue, white, orange, yellow, ultraviolet (UV), and/or infrared (IR) lights within the spectrum.

The controller 155 may include one or more computing or processing devices with memory in some examples, such as a computing or processing device comprising one or more hardware processors, memory, a data bus, and program instructions stored in the memory that direct operation of the retractable lighting device 100. Alternatively, the controller 155 may include an integrated circuit (IC) having processing circuitry or other suitable controller componentry.

Figure 4:
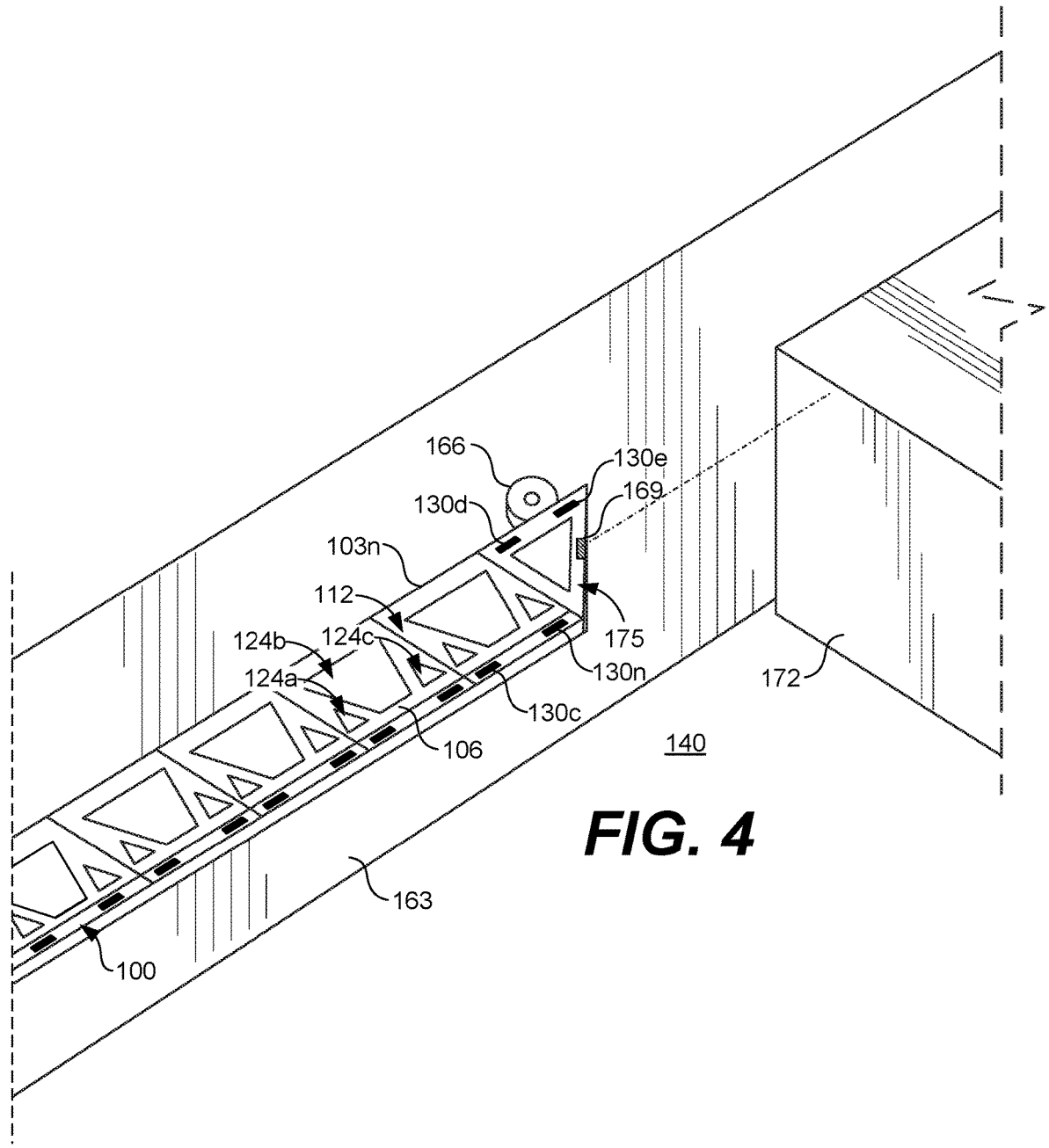
FIG. 4 is an enhanced perspective view of the retractable lighting device shown relative to an interior of the trailer according to various embodiments of the present disclosure.

Moving along to FIG. 4, an enlarged view of a portion of the retractable lighting device 100 is shown positioned near an interior side surface 163 of the trailer 140. In various embodiments, the retractable lighting device 100 includes a wheel 166 positioned on a distal or a most-distal one of the segments 103n relative to a base of the retractable lighting device 100. While FIG. 4 shows a single wheel 166, it is understood that one or more wheels 166 may be employed. The wheel 166 may include one or more skate wheels in some embodiments. Further, the wheel 166 may be formed of a magnetic material, such as aluminum, for interior side surfaces 163 that are magnetic.

The wheel 166 may be sized and positioned to come into contact with an interior side surface 163 of a trailer 140 as the retractable lighting device 100 extends from the coiled state (or other collapsed or deformed state) to the elongated state shown in FIG. 4. To come into contact with the interior side surface, in some embodiments, the wheel 166 may be affixed to a third face 115 of the distal one of the segments 103, also referred to as a tip segment 103, such as representative segment 103n shown in FIG. 4. It is understood that a cantilevered device, such as the retractable lighting device 100, may have a bend that increases as the retractable lighting device 100 extends from its base. As such, the wheel 166 coming into contact with the interior side surface 163 of the trailer 140 provides additional stability for the retractable lighting device 100, facilitates extension and retraction of the retractable lighting device 100, and prevents the retractable lighting device 100 from bending or overarching and potentially impairing its structural integrity.

In various embodiments, the retractable lighting device 100 may perform collision detection and object avoidance and, as such, may include an object detection and collision avoidance system. For instance, the retractable lighting device 100 may include one or more proximity sensors 169 configured to identify the presence of an object 172 (e.g., a box, container, or other cargo) that may prohibit the retractable lighting device 100 from extending further into the interior 143 of the trailer 140. In some embodiments, a proximity sensor 169 is positioned on an outward face 175 of a most-distal one of the segments 103 relative to the facility. In various embodiments, the proximity sensor 169 may include a radar proximity sensor, a light-detection-and-ranging (LIDAR) proximity sensor, an ultrasonic proximity sensor, a camera where the controller 155 is configured to determine a proximity or depth based on images captured by the camera, or other suitable proximity sensor 169.

Based on a measurement obtained from the proximity sensor 169, the controller 155 may determine whether or not to advance the retractable lighting device 100 further into the interior 143 of the trailer 140, thereby automating the extension of the retractable lighting device 100 when personnel remove objects 172 from the trailer 140, such as boxes, liquid containers, and so forth. More specifically, when objects 172 are removed from the trailer 140, the retractable lighting device 100 will continue to extend further into the trailer 140 without manual intervention by personnel. As such, adequate light will continue to be provided in the interior 143 of the trailer 140.

As discussed above with respect to FIG. 1, the third face 115 of the segments 103 may be aligned with the interior side surface 163 of the trailer 140. For instance, when the retractable lighting device 100 is at least partially extended into the interior of the trailer, the wheel 166 will come into contact with the interior side surface 163 of the trailer 140 and the third face 115 will be parallel to the interior side surface 163. The second face 112 of the segments 103, as shown in FIG. 4, may include a second set of light emitting components 130c, 130n that are configured to project light in a downwards direction.

According to various embodiments, on the second face 112, the light emitting components 130 may be positioned below the second notched out region 121 although, in other embodiments, the light emitting components 130 may be positioned above the second notched out region 121 or in another suitable location. Other suitable positions and arrangements of the light emitting components 130 may be employed.

In some embodiments, individual ones of the segments 103 are the same or substantially similar to the representative one of the segments 103a discussed with respect to FIG. 1; however, the most-distal one of the segments 103, shown in FIG. 4 as representative segment 103n, may be partially unique as it has a proximity sensor 169. Furthermore, the most-distal one of the segments 103, or the tip segment 103, may include one or more light emitting components 130d, 130e that shine light in a forward direction relative to a longitudinal axis of the retractable lighting device 100.

As discussed above, to reduce a weight of each segment 103 and the overall body of the retractable lighting device 100, the second face 112 may include second notched out regions 121a . . . 124c. The notched out regions 124 may include areas with no frame or areas having portions of the frame 106 removed, as may be appreciated. As shown in FIG. 4, in some embodiments, the notched out regions 118, 121, and 124 are triangular-shaped notched out regions.

Figure 5:
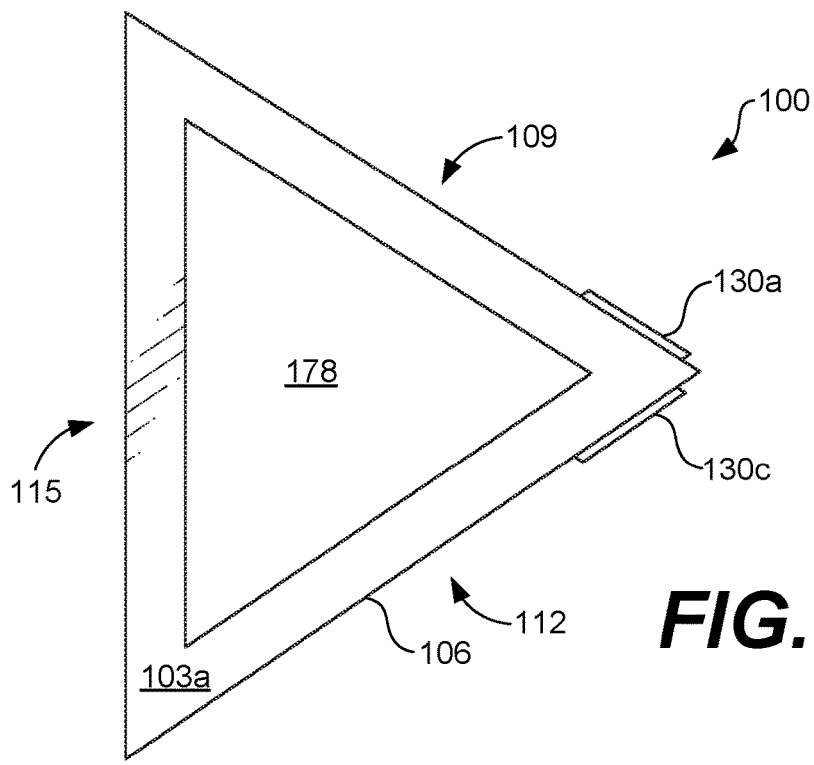
FIG. 5 is a side view of the retractable lighting device according to various embodiments of the present disclosure.

Moving along to FIG. 5, a side view of the retractable lighting device 100 is shown according to various embodiments. Specifically, the side view of the retractable lighting device 100 illustrates a position of the first face 109, the second face 112, and the third face 115 relative to one another. The first face 109 may include a first set of light emitting components 130a, 130b configured to project light in an upwards direction as well as a second face 112 having a second set of light emitting components 130c, 130n that are configured to project light in a downwards direction. Additionally, the frame 106 of the retractable lighting device 100 is shown as having an open side region 178.

Figure 6A:
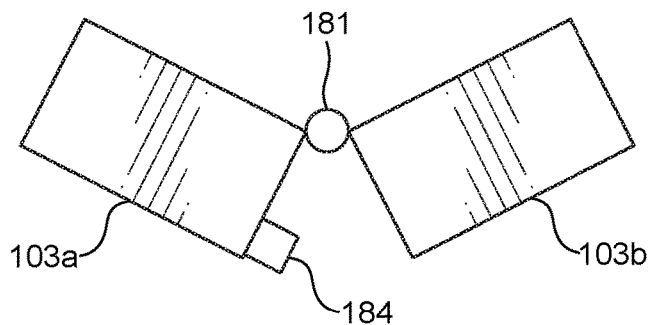
FIGS. 6A and 6B are top elevation views of adjacent segments of the retractable lighting device according to various embodiments of the present disclosure.
Figure 6B:
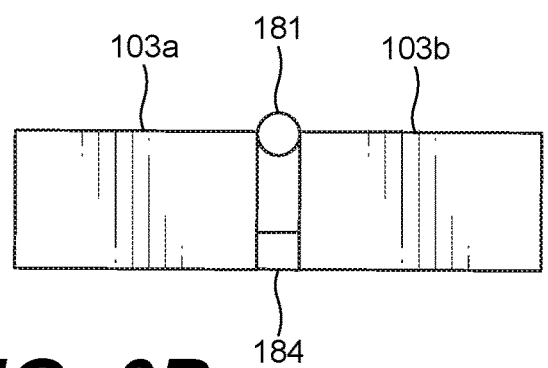

Turning now to FIGS. 6A and 6B, a top view of two example segments 103a, 103b of the retractable lighting device 100 are shown pivoting relative to one another. The two example segments 103 may include a portion or a subset of the retractable lighting device 100, as may be appreciated. More specifically, FIG. 6B shows two adjacent segments 103a, 103b without a pivot, for instance, in an elongated or non-collapsed state. FIG. 6A, on the other hand, shows two adjacent segments 103a, 103b pivoting relative to one another about a pin 181 or other connector that permits a segment 103 to pivot relative to an adjacent segment 103. The pivoting of the segments 103 may be performed, for instance, to transition the retractable lighting device 100 to a coiled or collapsed state. The segments 103a, 103b may be described as sharing a common pin 181 in some embodiments.

Additionally, a first one of the segments 103a may include a spacer 184 that prohibits the segments 103 from pivoting beyond parallel with one another. In some embodiments, the spacer 184 may be formed of a conductive material such that it acts as an electrical pad configured to contact and form an electrical connection with a corresponding electrical contact (not shown) of an adjacent segment 103b. The electrical pad may reduce use of wiring between segments 103, as may be appreciated.

Figure 7A:
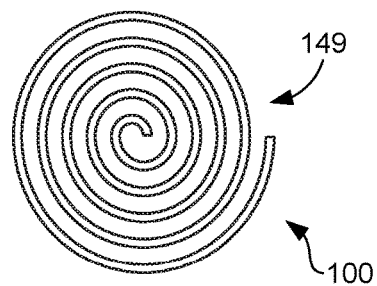
FIGS. 7A, 7B, and 7C are top elevation views of the retractable lighting device showing a fully collapsed state, a partially collapsed and non-collapsed state, and a fully non-collapsed state according to various embodiments of the present disclosure.
Figure 7B:
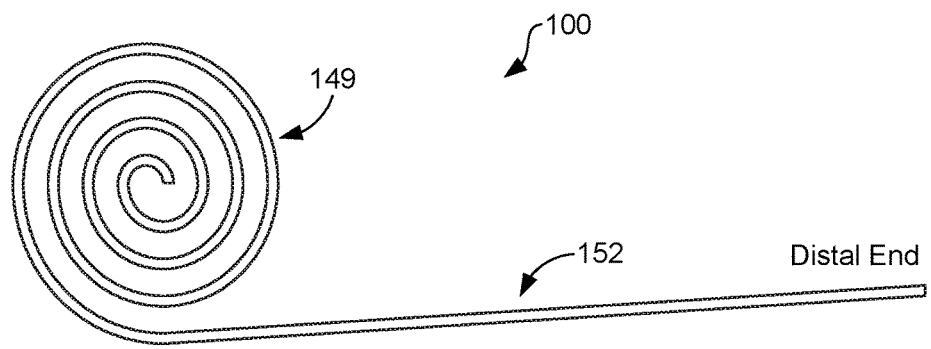
Figure 7C:
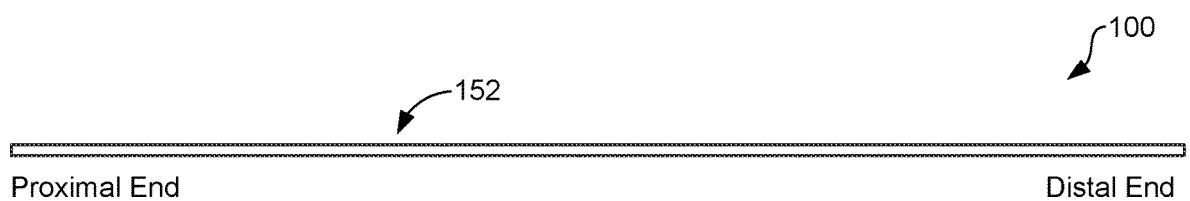

Referring next to FIGS. 7A-7C, different states of the retractable lighting device 100 are shown according to various embodiments. Specifically, FIG. 7A shows a top view of the retractable lighting device 100 in a fully coiled state or a fully collapsed state. When the retractable lighting device 100 is in a fully coiled or collapsed state, it is understood that the retractable lighting device 100 is being stored as it is not in use. While the retractable lighting device 100 is circularly in shape, it is understood that, in embodiments in which the segments 103 are triangular-shaped, the top view of the retractable lighting device 100 may include multiple rectangular portions pivoting with respect to one another, such as the pivoting adjacent segments 103 shown in FIG. 6A.

FIG. 7B shows the retractable lighting device 100 in a partially coiled state and partially extended or elongated state. In other words, the retractable light device 100 includes a coiled portion 149 that may be affixed or otherwise coupled to a wall or other suitable region of a facility. Additionally, the retractable lighting device 100 includes an extended portion that is elongated and extends from the coiled portion 149 through a dock door and into the interior 143 of the trailer 140. As shown above with respect to FIGS. 2 and 3, the extended portion 152 may be cantilevered with respect to the coiled portion 149. In other words, the extended portion 152 of the retractable lighting device 100 is only supported at only one end (e.g., at the coiled portion 149).

FIG. 7C, on the other hand, shows the retractable lighting device 100 in a fully extended and non-collapsed state. A proximal end of the retractable lighting device 100 may include a base of the retractable lighting device 100 that is fixed to a structure, such as a wall, roof, or floor of a warehouse or other facility. A distal end of the retractable lighting device 100 may include an end opposite that of the proximal end, and may include a tip segment 103 or a most-distal one of the segments 103 as may be appreciated.

Figure 8:
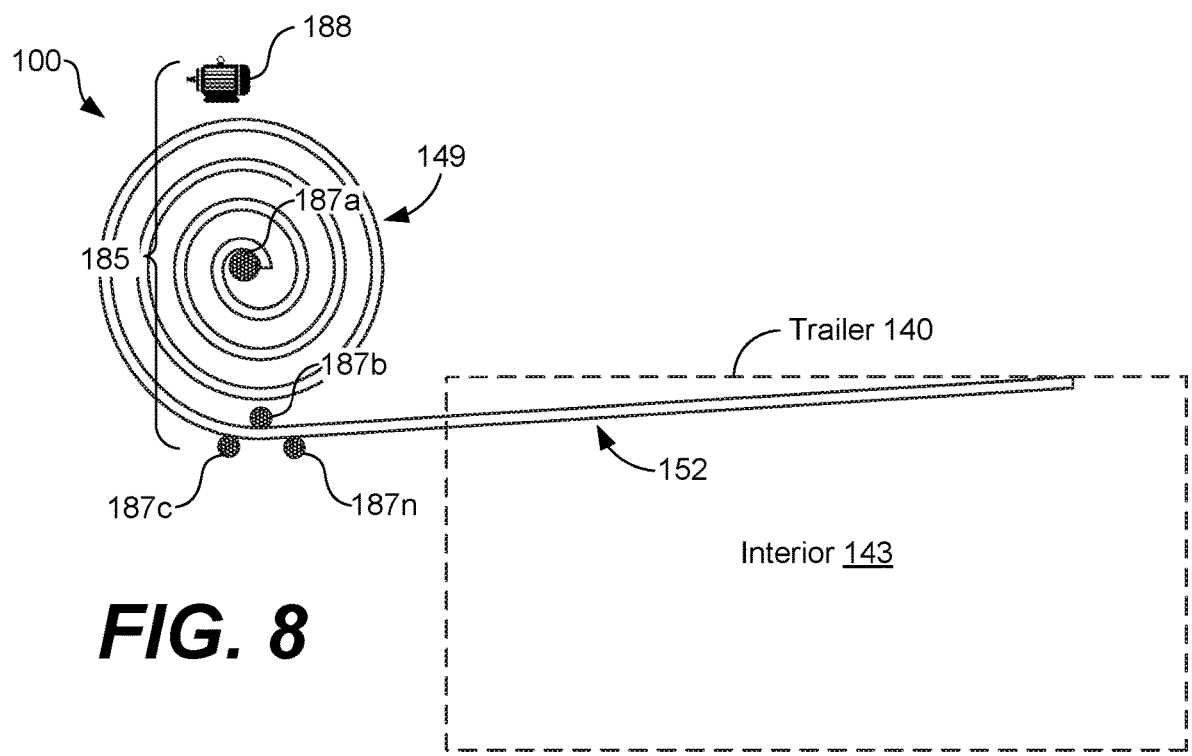
FIG. 8 is a top elevation view of the retractable lighting device showing a driving mechanism for transitioning the retractable lighting device between states according to various embodiments of the present disclosure.

Referring now to FIG. 8, a top view of the retractable lighting device 100 is shown according to various embodiments. In some embodiments, the retractable lighting device 100 or a system associated therewith includes a driving mechanism 185. The driving mechanism 185 may include driving wheels 187a . . . 187n (collectively "driving wheels 187") that are driven by one or more motors 188 and/or gears, where the driving wheels 187 come into contact with a surface of the retractable lighting device 100 to extend the retractable lighting device 100 from a coiled or collapsed state to an extended or non-collapsed state. In other words, in some embodiments, the driving mechanism 185 may include one or more driving wheels 187 in contact with the retractable lighting device 100 and at least one motor 188 configured to drive at least one driving wheel 187 in response to receipt of a signal from the controller 155.

In some embodiments, a single one of the driving wheels 187 (e.g., driving wheel 187a) is employed that contacts a single surface of the retractable lighting device 100. In other embodiments, a plurality of driving wheels 187 may be employed. For instance, a first subset of the driving wheels 187 (e.g., driving wheel 187b) may be positioned to contact a first surface of the retractable lighting device 100, and a second subset of the driving wheels 187 (e.g., driving wheels 187c, 187n) may be positioned to contact a second, opposite surface of the retractable lighting device 100. The driving wheels 187 may be driven in two directions, for instance, to extend the retractable lighting device 100 into the interior 143 of the trailer 140, and to retract the retractable lighting device 100 back into a warehouse or other facility. The positioning of the driving wheels 187 may also serve as a guide or a sleeve that prevents the coiled portion 149 from unrolling during storage.

Figure 9:
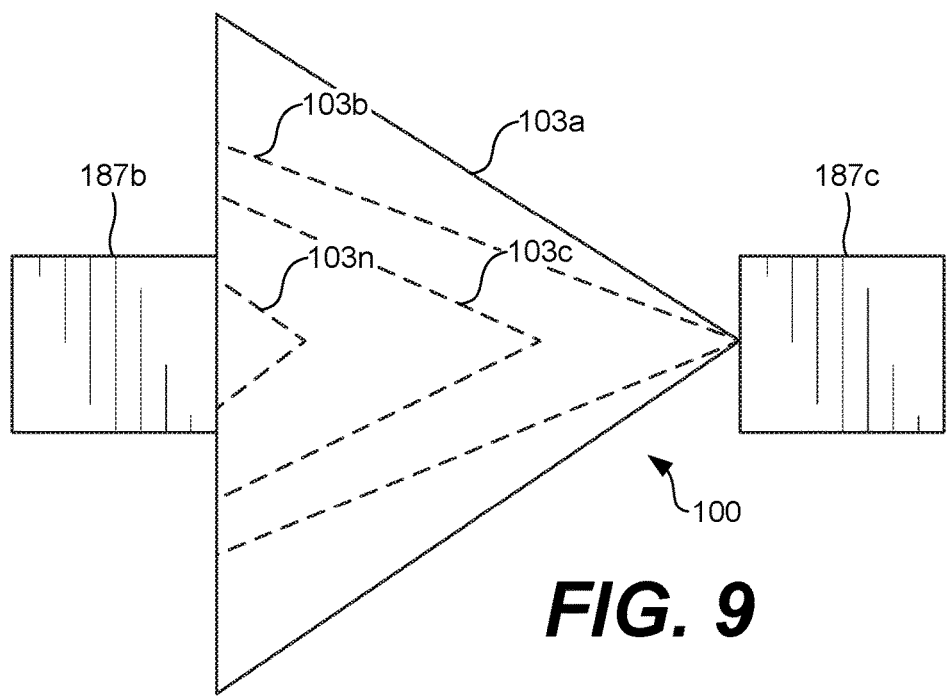
FIG. 9 is a side view of the retractable lighting device according to various embodiments of the present disclosure.
Figure 10:
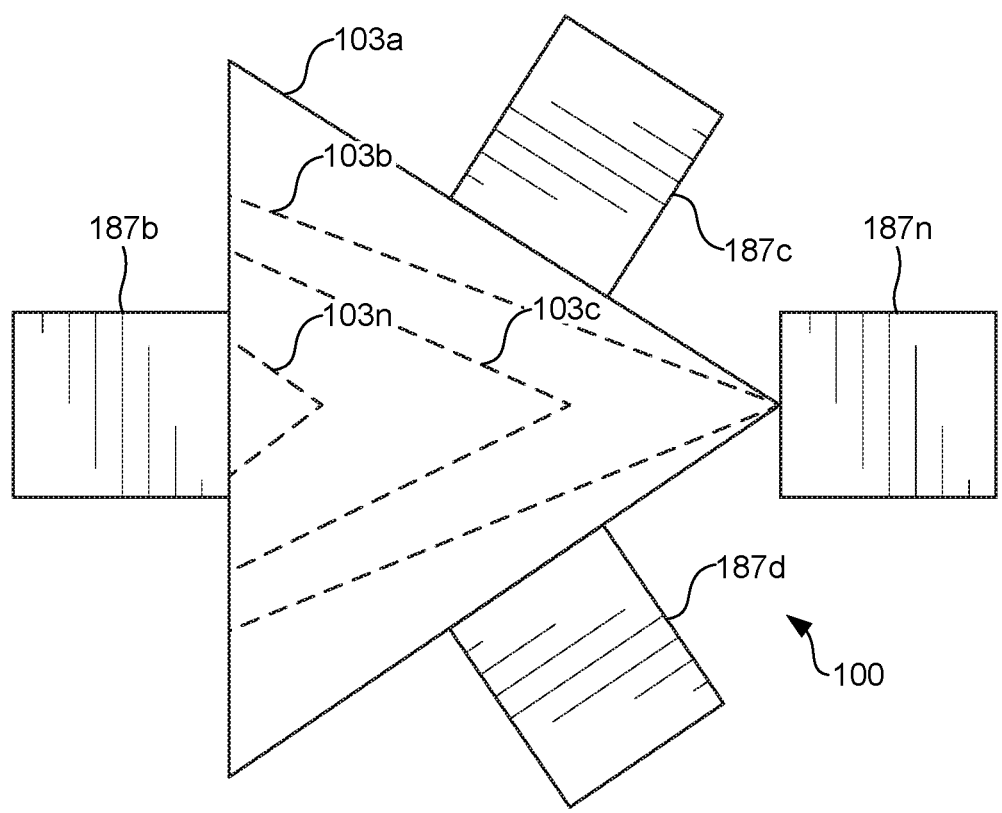
FIG. 10 is a side view of the retractable lighting device according to various embodiments of the present disclosure.

Additionally, the driving wheels 187 may be sized and positioned to facilitate alignment of the retractable lighting device 100 with a dock door, a trailer 140, or other area to be illuminated. For instance, driving wheels 187b, 187c, and 187n may be positioned such that a distal end of the retractable lighting device 100, when extended, assumes an angle relative to the interior side surface 163 of the trailer 140 such that the distal end comes into contact with the interior side surface 163 as it extends. As the retractable lighting device 100 continues to extend, the distal end of the retractable lighting device 100 slides along the interior side surface 163 (e.g., using the wheel 166), providing additional stability and ensuring structural integrity of the frame 106. In other words, the driving wheels 187 are sized and positioned to align the retractable lighting device 100 relative to the dock door or the trailer 100 as the retractable lighting device 100 is transitioned from the coiled state to the elongated state Turning now to FIGS. 9, 10, and 11, side cross-section views of the retractable lighting device 100 are shown relative to the driving wheels 187b, 187c, 187d, and 187n. Referring first to FIG. 9, as noted above, in some embodiments, segments 103 of the retractable lighting device 100 may become decreasingly smaller and/or lighter the further the segment 103 is located relative to a base or a proximal one of the segments 103. In other words, a most-distal one of the segments 103n relative to a base of the retractable lighting device 100 (e.g., a location at which the retractable lighting device 100 is affixed to a structure) may be a smallest and/or a lightest one of the segments 103, whereas a most-proximal one of the segments 103a relative to the base of the retractable lighting device 100 may be a largest and/or a heaviest one of the segments 103. FIGS. 9 and 10 show the cross-sections of each of the segments 103 being different with respect to one another.

Figure 11:
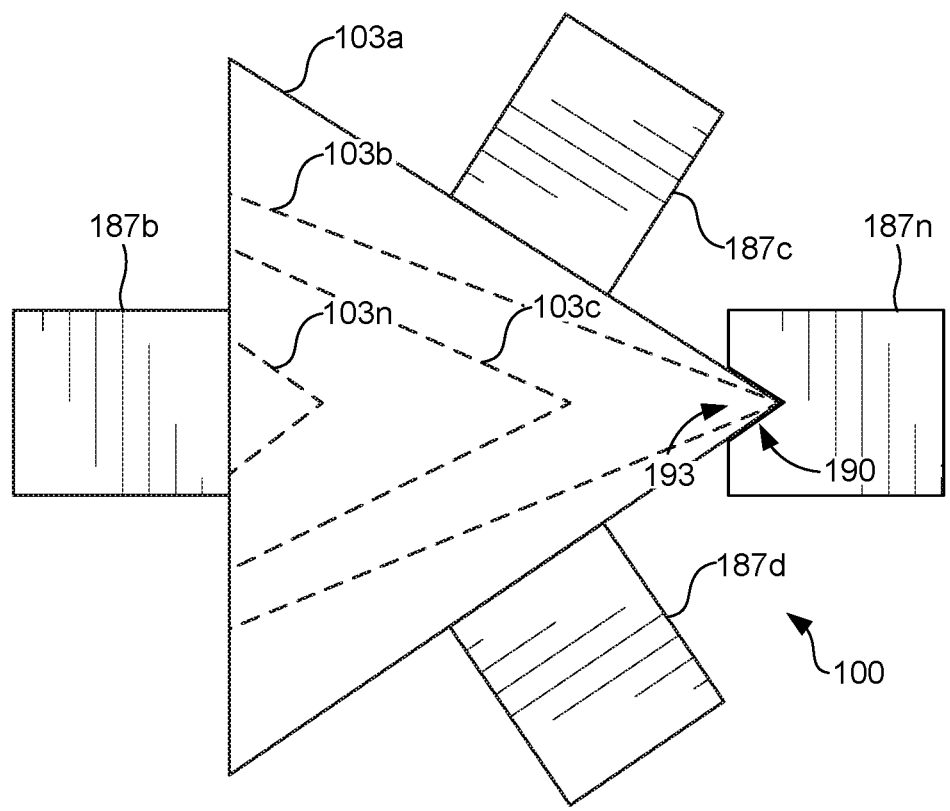
FIG. 11 is a side view of the retractable lighting device according to various embodiments of the present disclosure.

Referring to the embodiment shown in FIG. 9, the larger and/or heavier ones of the segments 103 on a proximal end of the retractable lighting device 100 (e.g., segments 103a, 103b) may be driven from opposing sides using driving wheels 187b, 187c. However, the smaller and/or lighter ones of the segments 103 (e.g., segments 103c, 103n) may have a different size and/or shape such that they are driven only using a single wheel 187b. Referring to FIGS. 10 and 11, the larger and/or heavier ones of the segments 103 on a proximal end of the retractable lighting device 100 (e.g., segments 103a, 103b) may be driven from opposing sides using driving wheels 187b, 187c, 187d, and 187n. However, the smaller and/or lighter ones of the segments 103 (e.g., segments 103c, 103n) may have a different size and/or shape such that they are driven only using a single wheel 187b.

In some embodiments, a first portion of the driving wheels 187 (e.g., driving wheel 187a and/or driving wheel 187b) may be actively driven by a motor 188, and a second portion of the driving wheels 187 (e.g., driving wheel 187c and/or driving wheel 187n) may be passively driven, thereby acting as a guide or sleeve that orients that retractable lighting device 100 as it uncoils into an elongated state.

As shown in FIG. 9, the driving wheels 187 may extend or retract the retractable lighting device 100 by contacting a third face 115 of the segments 103 and/or a nose of the segments 103. However, as shown in FIG. 10, the driving wheels 187 may extend or retract the retractable lighting device 100 by contacting a first face 109, second face 112, third face 115, and/or a nose of the segments 103. Additionally, although shown as having square or rectangular cross-sections, it is understood that the driving wheels 187 may have cross-sections with other shapes, such as circular cross-sections, oval-shaped cross-sections, and the like.

Turning now to FIG. 11, in some embodiments, one or more of the driving wheels 187 may have a shape that conforms to a surface or other portion of the retractable lighting device 100. For instance, as shown in FIG. 11, the driving wheel 187n includes a notched portion 190 that receives a pointed portion 193 of the segments 103 of the retractable lighting device 100. As the driving wheel 187 conforms to the shape of the segments 103, the driving wheel 187 comes into better contact with the surface of the segments 103, thereby facilitating the expansion or retraction of the retractable lighting device 100.

Figure 12:
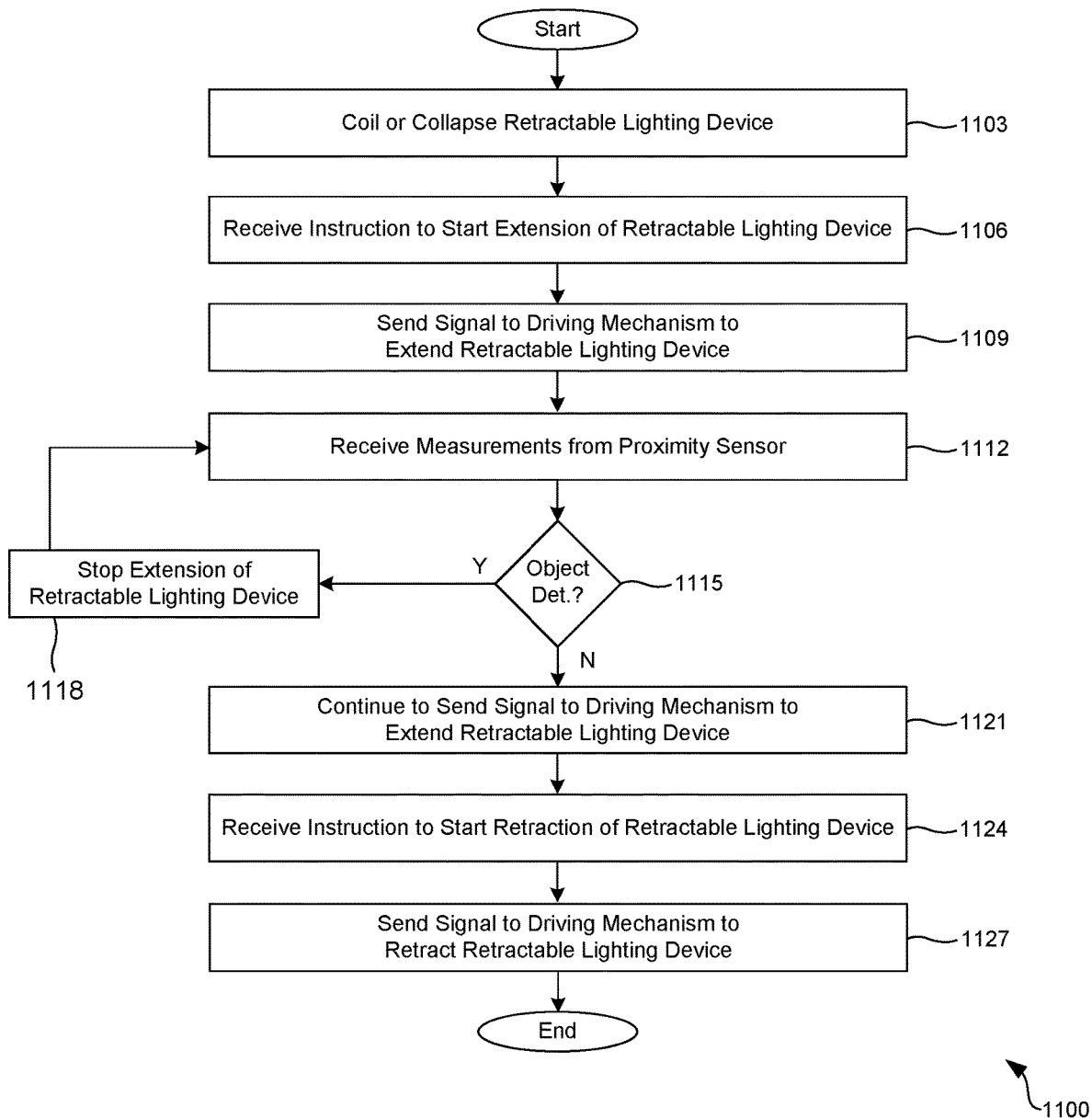
FIG. 12 is a flowchart showing example functionality of a controller according to various embodiments of the present disclosure.

Moving on to FIG. 12, a flowchart 1100 is shown that provides one example of the operation of a portion of the controller 155 according to various embodiments. It is understood that the flowchart of FIG. 12 provides merely an example of the many different types of functional arrangements that may be employed to implement the operation of the portion of the controller 155 as described herein. As an alternative, the flowchart of FIG. 12 may be viewed as depicting an example of elements of a method implemented in a computing device or in an electrical circuit according to one or more embodiments.

Beginning with box 1103, the controller 155 may generate a signal to coil or otherwise collapse a retractable lighting device 100 for storage. For instance, the controller 155 may generate a signal that causes the segments 103 of the retractable lighting device 100 to pivot relative to one another, thereby forming the coiled portion 149 shown in FIG. 7A.

Next, in box 1106, the controller 155 may receive an instruction to start an extension of the retractable lighting device 100, for instance, to illuminate an area. In one example, a button, switch, or other control may be positioned on a wall or other suitable area of a warehouse or other facility, where the button, switch, or other control is electrically coupled to the controller 155. When the button, switch, or other control is pressed or otherwise manipulated, a signal may be sent to the controller 155 directing the controller 155 to begin extension of the retractable lighting device 100.

In another example, the instruction may be received from a computing device, such as a mobile computing device or a client device. In some facilities, warehouse personnel may be assigned smartphones, laptops, or tablet computing devices that direct loading and unloading operations, requiring an operator to mark tasks as being completed during an unload or load process. For instance, personnel are required to mark off an item as being complete when a trailer 140 is aligned with a dock door, mark off an item as being complete when a dock plate 146 is installed, and so forth. The computing device may recognize when an unloading or loading operation is ready to be performed and, as such, the computing device may send an instruction to the controller 155 to extend the retractable lighting device 100.

Thereafter, in box 1109, the controller 155 may send a signal to a driving mechanism 185 to extend the retractable lighting device 100. In some embodiments, the driving mechanism 185 may include a motor 188 that drives one or more driving wheels 187 in contact with a surface of the retractable lighting device 100 sufficient to advance or retract the retractable lighting device 100. To this end, the signal sent by the controller may include a direct current (DC) signal or an alternating current (AC) signal, for instance, depending on a motor type. The DC signal may include a pulse-width modulation (PWM) signal or a step signal for driving the motor 188 in some embodiments. The AC signal, on the other hand, may include a signal having an adjustable frequency that permits a motor speed to be precisely controlled.

In some embodiments, extension of the retractable lighting device 100 includes the retractable lighting device 100 includes transitioning the retractable lighting device 100 from being wholly contained in a facility to an elongated state where at least a portion of the retractable lighting device 100 extends through the dock door and into the interior 143 of the trailer 140, and vice versa. For instance, in some embodiments, the controller 155 may be configured to transmit a signal to the driving mechanism 185 that causes the driving mechanism 185 to transition the retractable lighting device 100 from a coiled state wholly contained in a facility to an elongated state where at least a portion of the retractable lighting device 100 extends through the dock door and into the interior 143 of the trailer 140, and vice versa.

In some embodiments, an indicator light, such as a colored light bulb or a multi-color LED, may be mounted in an area of the facility that indicates a state of extension and/or retraction of the retractable lighting device 100. For instance, the indicator light may be green as the retractable lighting device 100 advances into the interior 143 of the trailer 140 or other area, and may turn red when an object 172 has been detected and the extension of the retractable lighting device 100 has been stopped. An illumination and/or a color of the indicator light may be adjusted by the controller 155.

Further, in some embodiments, a rotary encoder may be employed to determine an amount of the retractable lighting device 100 extended. The indicator light may be adjusted based on the amount of the retractable lighting device 100 that is extended in various embodiments.

As the retractable lighting device 100 is being moved or extended from a coiled or collapsed state, in box 1112, the controller 155 may receive measurements from the proximity sensor 169. In some embodiments, the proximity sensor 169 may be positioned on an outward face 175 of a most-distal one of the segments 103 relative to a facility, where the proximity sensor 169 may include a radar proximity sensor, an ultrasonic proximity sensor, a camera where the controller 155 is configured to determine a proximity or depth based on images captured by the camera, or other suitable proximity sensor 169.

In 1115, the controller 155 may determine whether an object 172 has been identified and/or detected that may inhibit the forward progress of the retractable lighting device 100. For example, based on a measurement obtained from the proximity sensor 169, the controller 155 may determine whether or not to advance the retractable lighting device 100 further into the interior 143 of the trailer 140.

If an object 172 has been detected that may inhibit the forward progress of the retractable lighting device 100, the process may proceed to box 1118. In box 1118, the controller 155 may stop the extension of the retractable lighting device 100. For instance, the controller 155 may stop sending a signal to the motor 188 or other driving mechanism 185. Thereafter, the process may revert to box 1112 to continue receiving measurements from the proximity sensor 169.

Referring again to box 1115, if an object 172 is not detected by the controller 155, the process may proceed to box 1121. In box 1121, the controller may continue to send a signal to the motor or other driving mechanism 185 to continue to extend the retractable lighting device 100. By implementing object detection and avoidance, operation of the retractable lighting device 100 is automated such that an extension of the retractable lighting device 100 is performed automatically when personnel remove objects 172 from the trailer 140, such as boxes, liquid containers, and so forth. More specifically, when objects 172 are removed from the trailer 140, the retractable lighting device 100 will continue to extend further into the trailer 140 without manual intervention by personnel. As such, adequate light will continue to be provided in the interior 143 of the trailer 140. It is understood that the process may automatically continue until the retractable lighting device 100 is fully extended, as shown in FIG. 7C, a manual override has been initiated, or an instruction to retract has been received.

Next, in box 1124, the controller 155 may receive an instruction to start a retraction of the retractable lighting device 100. For instance, personnel is the facility may again manipulate the button, switch, or other control to start a retracting of the retractable lighting device 100 back into the facility in the coiled or collapsed state. The manipulation of the button, switch, or other control may send an AC signal or DC signal to the controller 155 indicating that the retractable lighting device 100 should be redacted.

In another example, the instruction to start the retraction may be received from a computing device, such as a mobile computing device or a client device. As noted above, warehouse personnel may utilize smartphones, laptops, or tablet computing devices that direct loading and unloading operations. For instance, personnel are required to mark off an item as being complete when a trailer 140 is aligned with a dock door, mark off an item as being complete when a dock plate 146 is installed, and so forth. The computing device may recognize when an unloading or loading operation has been completed and, as such, the computing device may send an instruction to the controller 155 to retract the retractable lighting device 100.

As such, in box 1127, the controller 155 may send a signal to the motor or other driving mechanism 185 to retract the retractable lighting device 100. For instance, by pulling the retractable lighting device 100 through the driving wheels 187, segments 103 of the retractable lighting device 100 will pivot relative to each other and coil, eventually returning to the states shown in FIGS. 7B and 7A, respectively. Thereafter, the process may proceed to completion.

While embodiments described herein relate to triangular-shaped segments 103 that are coupled to one another, in alternative embodiments, other shaped structures may be employed without deviating from the scope of the present disclosure. For instance, other coiled structures may be employed, such as a curved spring steel body having one or more light emitting components 130 disposed thereon, where the curved spring steel body has a structure similar to that of a tape measure.

The features, structures, or characteristics described above may be combined in one or more embodiments in any suitable manner, and the features discussed in the various embodiments are interchangeable, if possible. In the description above, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims. The terms "first," "second," etc. are used only as labels, rather than a limitation for a number of the objects.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a retractable lighting device comprising a plurality of segments pivotably and electrically coupled to one another being configured to transition between a coiled state and an elongated state, wherein the retractable lighting device is affixed to a building relative to a dock door and comprises at least one light emitting component and at least one proximity sensor;
   a driving mechanism comprising at least one motor and at least one driving wheel, wherein the at least one driving wheel is in contact with at least one surface of the retractable lighting device and aligns the retractable lighting device relative to the dock door as the retractable lighting device is transitioned from the coiled state to the elongated state; and
   a controller communicatively coupled to the driving mechanism, wherein the controller is configured to:
   receive a measurement from the at least one proximity sensor;
   determine whether an object is present that inhibits the retractable lighting device from further transitioning from the coiled state to the elongated state based at least in part on the measurement; and
   in response to no object being present, transmit a signal to the at least one motor to drive the at least one driving wheel,
   wherein a first rotation of the at least one driving wheel causes the retractable lighting device to transition from a coiled state wholly contained in the building to an elongated state where at least a portion of the retractable lighting device extends through the dock door; and
   wherein a second rotation of the at least one driving wheel causes the retractable lighting device to transition from the elongated state where at least the portion of the retractable lighting device extends through the dock door to the coiled state wholly contained in the building.

2. The system of claim 1, further comprising a trailer aligned with the dock door, wherein the portion of the retractable lighting device is configured to extend into an interior of the trailer and come into contact with an interior side surface of the trailer.

3. The system of claim 1, wherein:
   the at least one light emitting component is a plurality of light emitting components;
   the retractable lighting device comprises a plurality of triangular-shaped segments; and
   each of the plurality of triangular-shaped segments comprises a first face having a first set of the plurality of light emitting components configured to project light in an upwards direction and a second face having a second set of the plurality of light emitting components configured to project light in a downwards direction.

4. A system, comprising:
   a retractable lighting device comprising at least one light emitting component, wherein the retractable lighting device comprises a plurality of segments pivotably and electrically coupled to one another;
   a driving mechanism; and
   a controller communicatively coupled to the driving mechanism, wherein the controller is configured to transmit a signal to the driving mechanism that causes the driving mechanism to transition the retractable lighting device from a collapsed state to a non-collapsed state and transition the retractable lighting device from the non-collapsed state to the collapsed state.

5. The system of claim 4, wherein:
   the at least one light emitting component is a plurality of light emitting components; and
   each of the plurality of segments comprises a first face having a first set of the plurality of light emitting components configured to project light in an upwards direction and a second face having a second set of the plurality of light emitting components configured to project light in a downwards direction.

6. The system of claim 5, wherein each of the plurality of segments is a triangular-shaped segment.

7. The system of claim 6, wherein the triangular-shaped segment is hollow and comprises a first notched out region on the first face, a second notched out region on the second face, and a third notched out region on a third face.

8. The system of claim 7, wherein the retractable lighting device comprises:
   a base configured to be affixed to a structure; and
   at least one wheel positioned on the third face of a most-distal one of the plurality of segments relative to the base, wherein the at least one wheel is sized and positioned to come into contact with an interior side surface of a trailer as the retractable lighting device extends from the collapsed state to the non-collapsed state.

9. The system of claim 4, wherein the driving mechanism comprises at least one driving wheel in contact with a surface of the retractable lighting device and at least one motor configured to drive the at least one driving wheel in response to receipt of the signal from the controller.

10. The system of claim 4, wherein:
    the at least one light emitting component is a plurality of light emitting components;
    the retractable lighting device comprises a base configured to be affixed to a structure;
    the plurality of segments comprise a most-distal one of the plurality of segments relative to the base; and the most-distal one of the plurality of segments comprises a distal face having a proximity sensor and at least one of the plurality of light emitting components positioned thereon.

11. The system of claim 10, wherein the controller is configured to transmit the signal based at least in part on a measurement obtained from the proximity sensor.

12. The system of claim 11, wherein the controller is further configured to:
transition the retractable lighting device from the collapsed state to the non-collapsed state in response to no object being detected by the proximity sensor; and
stop a transition of the retractable lighting device from the collapsed state to the non-collapsed state in response to an object being detected by the proximity sensor.

13. The system of claim 8, wherein the collapsed state is a coiled state and the non-collapsed state is an elongated state in which an extended portion of the retractable lighting device is cantilevered with respect to the base.

14. A method, comprising:
providing a retractable lighting device comprising at least one light emitting component and at least one proximity sensor;
making, by a controller, a determination to transition the retractable lighting device from a collapsed state to a non-collapsed state based at least in part on a measurement obtained from the at least one proximity sensor; and
transitioning the retractable lighting device based on the determination to transition.

15. The method of claim 14, wherein:
the collapsed state comprises a coiled state and the non-collapsed state comprises an elongated state; and
transitioning the retractable lighting device from the coiled state to a non-coiled state comprises sending a signal to at least one motor that actively drives at least one driving wheel in contact with a surface of the retractable lighting device.

16. The method of claim 15, wherein:
the at least one driving wheel comprises a first driving wheel, a second driving wheel, and a third driving wheel;
the first driving wheel is in contact with a first surface of the retractable lighting device; and
the second driving wheel and the third driving wheel are in contact with a second surface of the retractable lighting device, the second surface being different than the first surface.

17. The method of claim 14, wherein determining to transition the retractable lighting device from the collapsed state to the non-collapsed state comprises:
receiving the measurement from the at least one proximity sensor;
determining that no object is present that inhibits a forward progress of the retractable lighting device based at least in part on the measurement received from the at least one proximity sensor; and
transitioning the retractable lighting device in response to no object being present that inhibits the forward progress of the retractable lighting device.

18. The method of claim 14, wherein determining to transition the retractable lighting device from the collapsed state to the non-collapsed state comprises:
receiving the measurement from the at least one proximity sensor;
determining that an object is present that inhibits a forward progress of the retractable lighting device based at least in part on the measurement received from the at least one proximity sensor; and
abstaining from transitioning or stopping a transition of the retractable lighting device in response to the object being present that inhibits the forward progress of the retractable lighting device.

19. The method of claim 14, wherein:
the at least one light emitting component is a plurality of light emitting components;
the retractable lighting device comprises a plurality of triangular-shaped segments; and
each of the plurality of triangular-shaped segments comprises a first face having a first set of the plurality of light emitting components configured to project light in an upwards direction and a second face having a second set of the plurality of light emitting components configured to project light in a downwards direction.

20. The method of claim 14, wherein:
the collapsed state is a coiled state;
the non-collapsed state is an elongated state; and
the retractable lighting device comprises a plurality of segments pivotably and electrically coupled to one another being configured to transition between the coiled state and the elongated state.

* * * * *